2,760,868
Patented Aug. 28, 1956

United States Patent Office

2,760,868

METHOD OF PREPARING A PRECOOKED PORK SAUSAGE

Carl A. Thommen, Western Springs, Ill., assignor to Swift & Company, Chicago, Ill., a corporation of Illinois No Drawing. Application November 19, 1951,
Serial No. 257,187

5 Claims. (Cl. 99—109)

This invention relates to a process of preparing uncured pork sausage products which can be packaged and distributed to the consumer in a form requiring only a very short final cooking period immediately prior to serving.

Uncured pork sausage products have been prepared and distributed in many different forms. The most common form in which pork sausage products have been sold is the standard pork sausage links, which are packaged fresh and must be kept under refrigeration at all times prior to consumption. The volume of sales of this product has remained practically constant despite great increases in the volume of sales of frankfurters and other sausage products. Fresh pork sausage patties and pork sausage meat in bulk form are also sold, but in substantially smaller volumes. Each of the foregoing fresh pork sausage products has a relatively short storage life, requires careful supervision during distribution to prevent spoilage, and must be cooked for a relatively long period by the consumer prior to serving. Moreover, there is invariably a loss of weight of over 50 per cent during the cooking of each of the foregoing fresh sausage products. The lengthy cooking time required and the very substantial "shrink" of the fresh pork sausage products during cooking have apparently reduced the popularity of these products with respect to the competitive products, such as bacon and frankfurters, and other meat products which can be prepared in a relatively short time.

More recently, pork sausage links have been cooked in sealed containers such as the consumer type tin cans. Canned pork sausage links, however, do not have the desired texture or flavor expected of fresh pork sausage, and consequently there has not been a widespread consumer demand for the canned product.

It is the object of the present invention, therefore, to overcome the foregoing defects of the prior art and to provide an improved process for the preparation and distribution of pork sausage products.

Another object of the invention is to provide a process enabling a more appetizing pork sausage product to reach the consumer in a form which requires a minimum amount of preparation prior to serving.

Still another object of the invention is to provide a process for preparing a pork sausage product which loses a substantially smaller percentage of its weight during the cooking operations.

A further object of the invention is to provide a pork sausage product which has a substantially prolonged shelf life and retains its natural flavor for an extended period.

A still further object of the invention is to provide a pork sausage product having improved nutritive value.

Other objects of the invention will be apparent from the detailed description and the claims to follow.

The foregoing and other objects can be accomplished in general by performing an initial critical cooking operation on the pork sausage product prior to packaging and distributing the product to the consumer. The initial cooking operation is carried out so that the internal temperature of the pork sausage product exceeds the specifications of The Meat Inspection Department (M. I. D.) of the Department of Agriculture for pork products, but is discontinued before there is any appreciable external browning or crusting of the product. In performing the initial cooking operation the several time and temperature factors and other conditions must be controlled so that external browning and crusting can be delayed until the desired internal temperature is attained. In this manner it is possible to obtain a pork sausage product which must only be heated for a very short period by the consumer prior to serving and yet produce a product which has substantially improved texture, flavor and aroma, and which retains a much larger percentage of its original weight.

In practicing the present invention the exact conditions employed will depend upon several variables such as the composition of the pork sausage product, the form as the pork sausage product and the temperature of the of the pork sausage product and the temperature of the product prior to heating. For a pork sausage link product of standard formulation which has been chilled to a temperature of approximately 38° F. it has been found that internal temperatures between 160° F. and 200° F. may be satisfactorily employed, with a temperature of about 170° F. being preferred. The latter temperatures are substantially lower than those generally attained during the cooking of fresh pork sausage by the consumer. Consequently, there is substantially more of the natural meat juices and flavors retained in the body of the fully-cooked pork sausage product after the housewife has browned the pre-cooked sausage by heating in a skillet for three minutes.

During the initial cooking operation the heating is continued sufficiently long at the specified temperatures to insure the destruction of microorganisms, including those responsible for souring. Also, an essential function of the initial cooking operation is the formation of a layer of denatured proteinaceous material completely enclosing the exterior surface of the pork sausage product by subjecting to dry heat without, however, substantially browning or crusting the product. In this manner the interior of the product is protected against oxidation and recontamination, and at the same time excessive losses of the natural juices and moisture of the pork sausage meat are prevented during storage and subsequent browning by the consumer.

The actual cooking time during the initial cooking operation will, of course, depend upon the internal temperature desired to be attained in the product, the initial temperature of the product, the form and composition of the product, and the particular heating apparatus used. For the above mentioned pork sausage link product, an internal temperature of 170° F. can be attained within a period of between about 6 and 45 minutes in an oven having an internal temperature ranging between about 250° F. and 450° F. An oven temperature of approximately 350° F. is frequently found to be a satisfactory temperature. The heating operation may be performed in conventional oven heated by gas, steam coils, radiant coils, or any other dry heating means desired, including heating by induction and dielectric heating. However, since there are a great many variables, it is extremely difficult to arbitrarily state the temperature, time, and other specific operating conditions in the initial cooking operation. The operating conditions are readily determinable, nevertheless, by one skilled in the art after becoming familiar with the herein disclosed principles.

The most practical method of determining the operating conditions in a particular heating apparatus and for a particular product is to process a series of test lots of the particular product in the oven having a known interior temperature for varying periods until the product has attained a definite internal temperature within the specified temperature range. Heating of each test lot is terminated when the interior temperature of the product has attained a progressively higher temperature and preferably at about 10° F. intervals. Each test lot is then stored at 40° F., which simulates actual temperatures encountered during distribution and at regular intervals samples of each test lot are browned for a period of 3 minutes in a skillet, in the same manner as the consumer would finally cook the product, and the samples then scored for appearance, aroma, and flavor. The peroxide value of each sample may also be determined as an objective measure of oxidative rancidity. After a period of 3 weeks it will be readily evident which of the operating conditions produced a product having the most desirable properties.

It is, of course, understood that in each instance the heating in the initial cooking operation is discontinued before the product attains a significant degree of browning or crusting. When the product is heated during the initial cooking period in the foregoing manner it will be found that the product will have lost only between 30 and 40 per cent of its initial weight and will have retained sufficient amounts of moisture and fat so that the finally browned product will be much more plump and tender than the regular fresh pork sausage product after cooking under the most favorable conditions possible. The resulting improvement in flavor, aroma and texture of the product of the present invention is very striking. Likewise, the absence of any noticeable decrease in size of the pre-cooked pork sausage product during the final cooking operation is in marked contrast to the very great shrink which occurs when fresh pork sausages are cooked in the conventional manner. There actually appears to be an increase in size of the pre-cooked product during the final cooking operation.

So that the present invention can be thoroughly understood, the following specific example is given without, however, limiting the invention to the precise details and conditions set forth.

EXAMPLE I

A pork sausage meat formulation was prepared by passing the conventional pork sausage meat ingredients in the standard proportions through a standard hasher having a large opening in the discharge plate. The comminuted meat was subjected to a vacuum, and thereafter mixed for 6 minutes in the standard sausage mixer with approximately 7 ounces of natural sage and natural pepper for each 100 pounds meat. Water, sugar and salt were added in the conventional amounts. The foregoing coarse mixture was then passed through a conventional grinder having small openings in the discharge plate, and the finely ground meat was vacuumized for approximately 10 minutes in an atmosphere having a pressure of about 25 inches of mercury.

The meat was then fed into a stuffing machine, which in turn charged the meat into a stuffing machine which shaped the sausage into skinless links approximately 3½ inches long and weighing between 1 and 2 ounces, so that each pre-cooked link would weigh 1 ounce. The formed links were then discharged onto a continuous conveyor and carried through a heating tunnel having a temperature of about 300° F. The links were allowed to remain in the tunnel until they acquired an internal temperature of about 170° F. to insure the destruction of microorganisms and the production of a fully-cooked product, and also acquired the necessary external protective layer of denatured protein.

The pre-cooked pork sausage links were then conveyed past packaging stations where operators placed the pork sausage links into 8 ounce containers with each package containing 8 pre-cooked pork sausage links. The individual packages were then placed in chill and thereafter were ready for shipment.

In other tests following substantially the foregoing procedure, substantially the same pre-cooked pork sausage product was produced by forming the links with the conventional pork sausage stuffing machine using cellulose casings. After the links were chilled to about 0° F., the casings were stripped and the skinless links conveyed through a conventional gas heated oven wherein the links were pre-cooked to the same degree as in Example I in dry heat. The pre-cooked links were then packaged in the same manner as described in Example I.

In addition to having substantially improved flavor and aroma, the pre-cooked pork sausage products produced by the present invention have unusual properties not found in any of the other present pork sausage products. Thus, as a result of careful studies of comparative lots of fresh pork sausage and pre-cooked pork sausage, it was found that the fresh pork sausage are noticeably off-flavor as a result of souring and were in an unpalatable condition within about 5 to 7 days after being manufactured and held at a temperature of 40° F. The pre-cooked pork sausage described herein, however, retains substantially all of its initial flavor and aroma for a period in excess of 20 days under the same 40° storage conditions. The results of a side-by-side comparison are given in Table I.

*Table I*

| Product | Four Days Old | | Six Days Old | | Eight Days Old | | Eleven Days Old | | Twenty Days Old | |
|---|---|---|---|---|---|---|---|---|---|---|
| | Aroma | Flavor | Aroma | Flavor | Aroma | Flavor | Aroma | Flavor | Aroma | Flavor |
| Pre-cooked pork sausage containing natural sage and pepper | 8.0 | 8.0 | 7.2 | 7.8 | 6.7 | 6.6 | 7.8 | 7.8 | 7.3 | 7.1 |
| Fresh pork sausage containing natural sage and pepper | 6.2 | 4.6 | 2.6 | 1.7 | Sour | | | | | |
| Pre-cooked pork sausage containing spice extractives of sage and pepper plus 0.022% "Sustane" antioxidant | 7.1 | 7.5 | 7.0 | 7.3 | 6.5 | 6.8 | 6.4 | 6.7 | 6.3 | 6.4 |
| Pre-cooked pork sausage containing spice extractives of sage and pepper | 5.1 | 5.6 | 3.2 | 1.7 | Rancid | | | | | |

In conducting the above comparative keeping-quality tests, the same pork sausage formulation was used in each product, the same natural and commercial spice extractives were used as seasoning ingredients, and the same 40° F. storage condition was employed for each test lot. In evaluating each sample after the specified number of days had elapsed, an experienced test panel scored each of the products after it had been finally cooked on the basis of: 10 being excellent; 9, very good; 8, good; 7, slightly good; 6, border-line plus; 5, border-line minus; 4, slightly poor; 3, poor; 2, very poor; and 1, repulsive. The antioxidant used in one of the above tests is a commercial product and includes a mixture of butyl hydroxyanisole propyl gallate, and citric acid dissolved in propylene glycol as a solvent. Other anti-oxidants as sodium ascorbate, and such anti-oxidant containing oils as wheat germ oil, soybean oil, and cottonseed oil in an amount of about 1.0 per cent may also be used.

It will be evident from the data shown in Table I that the fresh pork sausage became sour and unpalatable after 6 days storage at 40° F., while the pre-cooked product remained in a marketable condition for over 20 days at the same storage temperature.

The data of Table I also show that there is a remarkable difference in the keeping qualities of pre-cooked pork sausage containing natural seasoning as compared with the pre-cooked pork sausage which contains the spice extractives conventionally used in the preparation of the regular fresh pork sausage products. The spice extractives used were the conventional oleo resins and volatile oils which are extracted from the natural spices by well-known processes and contain the active flavoring ingredients of the natural seasoning. Thus, the pre-cooked pork sausage containing the spice extractives used in fresh pork sausage was distinctly off-flavor in 5 days, whereas the pre-cooked pork sausage containing natural seasoning remains in very acceptable condition for over 20 days. The foregoing unusual and very unexpected result appears to be due to certain inherent anti-oxidant properties peculiar to the natural seasoning ingredients incorporated in the pre-cooked pork sausage. It was altogether unexpected that the anti-oxidant properties of the natural spices would affect the keeping qualities of the pre-cooked pork sausage because of the very minor percentage of seasoning used, and it is even more remarkable since it would normally be expected that the anti-oxidant properties would be destroyed by the heat treatment to which the product is subjected during the pre-cooking operation.

The deficiency in anti-oxidant properties of the spice extractives used in pork sausage may be at least partially overcome by the addition of an anti-oxidant material to the prepared seasoning prior to incorporating in the pork sausage meat. The extent to which the anti-oxidant improves the storage life of the pre-cooked pork sausage is evident from the data shown in Table I. Despite the later improvement, however, it is preferred to employ natural seasoning, such as natural pepper and sage, both for their greater effect on the keeping qualities of the product and upon the improved flavor and aroma of the final product.

In addition to the improvement in keeping qualities exhibited by the pre-cooked pork sausage as compared with the fresh pork sausage products, the pre-cooked pork sausage also exhibits substantially increased nutritive value. A comparison of the nutritive elements found in fresh pork sausage, and pre-cooked pork sausage, after each was finally cooked, is shown in the following Table II.

Table II

| Nutritive Element | Pork Sausage Cooked for Serving | |
| --- | --- | --- |
| | Fresh Pork Sausage | Pre-cooked Pork Sausage |
| Protein, percent | 21.1 | 23.1 |
| Fat, percent | 36.8 | 35.8 |
| Total ash, percent | 1.7 | 1.7 |
| Thiamine, mcg/gm | 2.9 | 3.4 |
| Riboflavin, mcg/gm | 3.8 | 4.1 |

An examination of the data of Table II shows that the pre-cooked product as compared with the regular cooked fresh pork sausage retains appreciably more protein. The pre-cooked pork sausage also retained more thiamine and riboflavin. It is also probable that other vitamins are also retained in larger amounts.

Another very significant property of the pre-cooked pork sausage which is not found in fresh pork sausage products is the property of the pre-cooked pork sausage to retain a substantially greater portion of its initial weight after being finally cooked or browned by the consumer.

Extensive tests of fresh pork sausage products which were carefully prepared in accordance with the recommended cooking procedure are shown in Table III.

Table III

| | Lot No. 1 | Lot No. 2 |
| --- | --- | --- |
| Uncooked weight, grams | 454 | 453 |
| Cooked weight, grams | 199 | 196 |
| Dripping weight, grams | 81 | 35 |
| Dripping shrink, percent | 17.8 | 7.7 |
| Total cooking shrink, percent | 56.2 | 56.7 |

As indicated by the data in Table III, it is customary for fresh pork sausage to lose over 50 per cent of its initial weight during the cooking operation.

Similar weight-loss tests conducted on pre-cooked pork sausage prepared in accordance with the present invention and having substantially the same formulation as the fresh pork sausage used to obtain data in Table III indicate that the pre-cooked pork sausage after final cooking loses a total of between 40 and 45 per cent of its initial weight.

Table IV gives the result of a typical weight-loss study of fresh and pre-cooked pork sausage, and includes the percentage loss in weight during the initial pre-cooking operation and the final weight loss during the browning performed by the consumer during the final cooking operation.

Table IV

| Pork Sausage Product | Percent Shrink During Pre-Cooking Operation | Percent Shrink During Final Cooking Operation | Percent Drip | Total Cooking Shrink, Percent |
| --- | --- | --- | --- | --- |
| Pre-cooked pork sausage heated to 170° F | 33 | 8.6 | 0.9 | 41.6 |
| Fresh pork sausage | | 54.1 | 11.8 | 54.1 |

As indicated in Table IV, the pre-cooked pork sausage product after final cooking invariably results in yields which are substantially larger than those of the fresh pork sausage product after cooking. This is a very substantial economical saving to the consumer and to the meat industry in general. Also, while the consumer is able to put to a useful purpose only a very small percentage of the fat rendered from fresh pork sausage during the cooking thereof, the commercial processor, because of his more careful control and more efficient method of handling, is able to recover and save substantially all of the fat rendered during the initial pre-cooking operation.

In order to show the critical influence which the internal cooking temperature and the natural spices have on the keeping qualities of pre-cooked uncured fresh pork sausage, two test lots of pork sausage links were prepared as described herein, with one containing natural sage and natural pepper and the other containing the conventional spice extractives of sage and pepper which are used in fresh pork sausage. A portion of each lot was heated to an internal temperature of 150° F. and the peroxide number of the product determined after holding at 40° F. for 3, 5 and 7 days. The peroxide number is a measure of the development of oxidative rancidity in the fats and oils, and technically designates the milliequivalents of peroxide per kilogram of fat. Additional portions of the test lots were heated at higher temperatures up to an internal temperature of 200° F. The results of the foregoing study are given in Table V.

Table V

| Cooking Temperature | Spice | Peroxide Number | | |
|---|---|---|---|---|
| | | Three Days Old | Five Days Old | Seven Days Old |
| 150° F | Natural | 0.81 | 0.48 | 0.46 |
| 150° F | Spice Extractives | 0.31 | 2.50 | 5.60 |
| 160° F | Natural | 0.97 | 0.58 | 0.29 |
| 160° F | Spice Extractives | 2.95 | 2.80 | 3.90 |
| 170° F | Natural | 0.64 | 0.26 | 0.20 |
| 170° F | Spice Extractives | 3.07 | 3.70 | 2.40 |
| 180° F | Natural | 1.08 | 0.87 | 0.57 |
| 180° F | Spice Extractives | 7.66 | 4.40 | 4.20 |
| 190° F | Natural | 0.85 | 0.44 | 0.87 |
| 190° F | Spice Extractives | 3.24 | 4.85 | 26.60 |
| 200° F | Natural | 0.77 | 0.51 | 0.82 |
| 200° F | Spice Extractives | 6.07 | 5.30 | 21.16 |

It will be evident that heating to an internal temperature of 170° F. produces the most stable product with the lowest peroxide value. While the product heated to an internal temperature of 150° F. did not turn rancid at the end of 7 days, it was unsatisfactory because of the development of a sour condition therein.

The herein-described process and product of the present invention makes it possible for the commercial processor to provide the consumer with a new pork sausage product having greater utility than any previous pork sausage product, since it may be kept for a substantially longer period without spoiling, or may be kept under less rigid storage conditions than any previous fresh pork sausage product. The invention also makes it possible for the consumer to obtain after only a short final cooking operation a pork sausage product which is more appetizing and nutritive because it contains a greater proportion of the natural flavor and nutritive components of the sausage meat and is not cured or smoked in order to improve its keeping qualities. The consumer also derives additional benefits because the present invention permits him to prepare an improved fully-cooked pork sausage product in a much shorter time than previously possible and without absorbing the customary large shrink in weight during the cooking process.

While the herein-disclosed embodiment of the present invention has been more particularly concerned with the preparation of pork sausage links, it should be understood that pork sausage products in the various other forms may also be produced. For example, pork sausage patties and pork sausage meat in bulk form can also be pre-cooked and distributed to the consumer in the same manner as the herein disclosed pork sausage links.

Obviously, many modifications and variations of the invention as hereinbefore set forth may be made without departing from the spirit and scope thereof, and therefore only such limitations should be imposed as are indicated in the appended claims.

I claim:

1. A method of cooking a fresh uncured, unsmoked pork sausage product comprising forming a pork sausage formulation by mixing pork meat containing lean and fat, spices, sugar, salt, and water; shaping the pork sausage formulation into a predetermined sausage form, subjecting the said sausage form to a dry heat treatment at a temperature between 250° and 450° F. and a period of between 6 minutes and 45 minutes, and adjusting the foregoing heating conditions so that the interior temperature of the said sausage form reaches between 160° and 200° F. before the surface area of the said sausage form is appreciably browned and crusted, said heat treatment substantially destroying the microorganisms responsible for souring of pork sausage and forming a layer of denatured proteinaceous material on the exterior surface of said sausage forms and terminating the said heat treatment before the said sausage form has lost in excess of 40 per cent of its original weight.

2. A process as described in claim 1, wherein the spices are selected from the group consisting of natural spices and spice extracts with a small amount of a fat antioxidant.

3. A process as described in claim 1 wherein the heat treatment is terminated when an internal temperature of 170° F. is attained in said sausage.

4. A method of preparing a precooked pork sausage suitable for distribution as a consumer item requiring only a short cooking period to brown the product before serving, which comprises subjecting the sausage to a cooking operation under conditions of dry heat at a temperature in excess of 250° F. to bring the sausage to an internal temperature of about 160° F.–180° F. before the surface of the sausage is appreciably browned and crusted to form a protective layer of denatured proteinaceous material on the exterior surface of the sausage, and terminating said heating before the loss in weight of the product is in excess of about 40%, the temperature and time of said cooking operation being correlated to produce a precooked sausage which is plump and can be browned by a short cooking period with substantially less cooking loss than in cooking ordinary fresh pork sausage.

5. A method of preparing a precooked pork sausage suitable for distribution as a consumer item requiring only a short cooking period to brown the product before serving which comprises subjecting the sausage to a cooking operation under conditions of dry heat at a temperature in excess of 250° F. for a period between six minutes and forty-five minutes to bring the sausage to an internal temperature of about 160° F.–200° F. before the surface of the sausage is appreciably browned and crusted to form a protective layer of denatured proteinaceous material on the exterior surface of the sausage, and terminating said heating before the loss in weight of the product is in excess of about 40%, the temperature and time of said cooking operation being correlated to produce a precooked sausage which is plump and can be browned by a short cooking period with substantially less cooking loss than in cooking ordinary fresh pork sausage.

References Cited in the file of this patent

UNITED STATES PATENTS

| 1,009,953 | Boyle | Nov. 28, 1911 |
| 1,964,011 | Vogt | June 26, 1934 |
| 2,182,211 | Paddock | Dec. 5, 1939 |
| 2,199,584 | Bemis | May 7, 1940 |
| 2,355,548 | Musher | Aug. 8, 1944 |
| 2,507,486 | Weissenbach | May 9, 1950 |
| 2,685,518 | Prohaska | Aug. 3, 1954 |

OTHER REFERENCES

"Food Industries," October 1942, page 49, article entitled "Antioxidant for Pork."